F. SAUVAGÉ.
OPTICAL INDICATING APPARATUS.
APPLICATION FILED OCT. 24, 1910.
1,065,845.
Patented June 24, 1913.
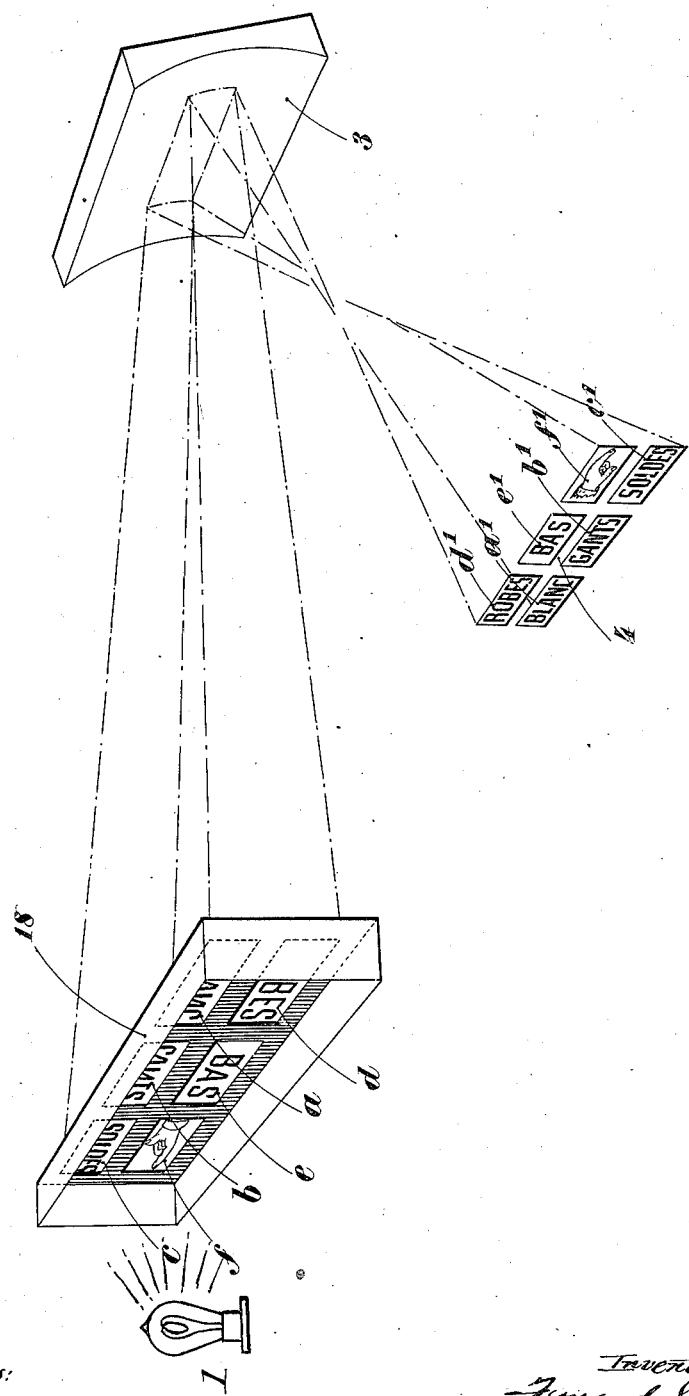

UNITED STATES PATENT OFFICE.

FERNAND SAUVAGÉ, OF MARSEILLE, FRANCE.

OPTICAL INDICATING APPARATUS.

1,065,845.  Specification of Letters Patent.  Patented June 24, 1913.

Application filed October 24, 1910. Serial No. 588,836.

*To all whom it may concern:*

Be it known that I, FERNAND SAUVAGÉ, a citizen of the French Republic, residing at Marseille, Department of the Bouches-du-Rhône, in France, have invented certain new and useful Improvements in Optical Indicating Apparatus; and I do hereby declare the following to be a full, clear, and exact description of the invention, such as will enable others skilled in the art to which it appertains to make and use the same.

This invention relates to advertising apparatus and more particularly to such apparatus wherein the advertising is done by the projection of light.

The invention aims to produce a device of the foregoing character, wherein the advertising legends or the like are projected in a manner which insures attraction of the public's attention.

The apparatus is especially adapted for use on stores or the like, where it is desirable to display various images to the public, whether such images be advertisements, notices or similar graphical representations.

Broadly, the invention consists in the provision of a panel containing a plurality of legends to be projected, in combination with an optical system, which is adapted to project said legends in such a way that only one is perceptible to the passer-by at one time. Separate and distinct aerial images are, therefore, formed, the certain image perceptible to the passer-by depending upon his relative position with respect to the optical system.

Referring to the drawing, the panel 18 is provided with a plurality of separate graphical representations $a$, $b$, $c$, $d$, $e$, located upon transparent sections of the panel 2 separated by opaque portions, whereby a projection of the legends will represent them in their independent and separated state.

The panel 18 is illuminated by any suitable source of illumination 1. The light rays passing through the panel are reflected by a mirror 3, which may be of any desired form capable of producing the desired result. In the present instance, a concave mirror is shown which is slightly inclined out of the vertical plane to reflect the image downwardly. The aerial panel is represented at 4 and the separate projected legends represented by $a'$, $b'$, $c'$, $d'$, $e'$, $f'$. The parts are so arranged that only one of the legends will be visible to a passer-by at one time, the particular image perceptible to him depending upon his relative position with respect to the mirror 3. As the observer changes his position, therefore, he will see the separate images in succession and, as the images constantly change before him, he will be greatly impressed by the curious result.

The apparatus hereinbefore described is capable of numerous applications where it is desirable to attract the attention of the public, and I do not wish to limit myself therefore, to any particular use.

What I claim is:—

In advertising apparatus, the combination of a source of illumination, a convergent optical system, and a partially transparent panel interposed between said source of illumination and the convergent optical system, said panel having a plurality of separate legends or devices to be projected spaced from each other, and said convergent optical system adapted to receive the light rays from the panel and project images of the legends or devices in space without the use of a screen, so that the legend visible to a passer-by depends upon the latter's position with respect to the convergent optical system, substantially as described.

In testimony whereof I affix my signature, in presence of two witnesses.

FERNAND SAUVAGÉ.

Witnesses:
 GEORGE S. BOUJA,
 H. C. COXE.